US009664298B2

(12) United States Patent
Okano

(10) Patent No.: US 9,664,298 B2
(45) Date of Patent: May 30, 2017

(54) FLOW CONTROL VALVE

(71) Applicant: Rinnai Corporation, Aichi (JP)

(72) Inventor: Yu Okano, Aichi (JP)

(73) Assignee: Rinnai Corporation, Aichi (JP)

( * ) Notice: Subject to any disclaimer, the term of this patent is extended or adjusted under 35 U.S.C. 154(b) by 148 days.

(21) Appl. No.: 14/842,646

(22) Filed: Sep. 1, 2015

(65) Prior Publication Data
US 2016/0061343 A1 Mar. 3, 2016

(30) Foreign Application Priority Data

Sep. 3, 2014 (JP) ................................. 2014-178759

(51) Int. Cl.
| F16K 31/44 | (2006.01) |
| F16L 7/00 | (2006.01) |
| F16K 27/02 | (2006.01) |
| F16K 27/12 | (2006.01) |
| F16L 7/02 | (2006.01) |

(52) U.S. Cl.
CPC .............. *F16K 27/02* (2013.01); *F16K 27/12* (2013.01); *F16L 7/00* (2013.01); *F16L 7/02* (2013.01); *Y10T 137/7036* (2015.04)

(58) Field of Classification Search
CPC ... Y10T 137/7036; F16K 27/00; F16K 27/02; F16K 27/0245; F16K 27/0254; F16K 27/0272; F16K 27/10; F16K 27/102; F16L 7/00; F16L 7/02
USPC .......... 137/375; 251/318, 333, 359, 366–368
See application file for complete search history.

(56) References Cited

U.S. PATENT DOCUMENTS

| 447,275 | A | * | 2/1891 | Berrenberg | ......... F16K 27/0272 137/375 |
| 3,573,863 | A | * | 4/1971 | Doors | ..................... F16K 51/02 137/375 |
| 3,751,004 | A | * | 8/1973 | Quirk | .................. B29D 23/008 156/173 |
| 5,158,106 | A | * | 10/1992 | McIntosh | ................ F16K 41/10 137/375 |
| 5,228,472 | A | * | 7/1993 | Ougiya | ................... F16K 41/12 137/312 |

(Continued)

FOREIGN PATENT DOCUMENTS

| JP | 07-139655 A | 5/1995 |
| JP | 2006-292131 A | 10/2006 |
| JP | 2012-219877 A | 11/2012 |

*Primary Examiner* — Mary McManmon
*Assistant Examiner* — Hailey K Do
(74) *Attorney, Agent, or Firm* — Nakanishi IP Associates, LLC

(57) ABSTRACT

A flow control valve includes a resin housing body, a valve member, a retainer plate, a drive unit, and a protective wall. The resin housing body is substantially cylindrical. The valve member axially moves back and forth in the housing body to regulate a flow rate of a liquid. The retainer plate is fastened to the housing body at a position axially outward from the bearing to retain the bearing in the housing body. The drive unit drives the valve stem at a position outward from the bearing to move the valve member back and forth. The protective wall surrounds an outer circumferential surface of the housing body at a position radially outward from a portion of the housing body that receives the bearing to form an air layer portion between the protective wall and the outer circumferential surface of the housing body.

6 Claims, 5 Drawing Sheets

(56) References Cited

U.S. PATENT DOCUMENTS

| | | | | |
|---|---|---|---|---|
| 5,597,009 A | * | 1/1997 | Scherrer | F16K 51/02 |
| | | | | 137/375 |
| 5,947,151 A | * | 9/1999 | Shafer | F17D 5/04 |
| | | | | 137/375 |
| 6,047,726 A | * | 4/2000 | Kaneshige | F16K 1/10 |
| | | | | 137/375 |
| 2008/0001110 A1 | * | 1/2008 | Nagai | F16K 1/38 |
| | | | | 251/122 |

* cited by examiner

Not frozen

Viewed in arrow P direction

Frozen

Viewed in arrow P direction

Not frozen

Viewed in arrow P direction

Frozen

Viewed in arrow P direction

FLOW CONTROL VALVE

CROSS-REFERENCE TO RELATED APPLICATIONS

This application claims priority from Japanese Patent Application No. 2014-178759 filed with the Japan Patent Office on Sep. 3, 2014, the entire content of which is hereby incorporated by reference.

BACKGROUND OF INVENTION

Field of the Invention

The present invention relates to a flow control valve including a resin housing.

Background Art

A flow control valve known in the art switches its passageways or regulates the flow rate by moving a valve member arranged inside a housing. The valve member is connected to one end of a valve stem. To move the valve member, the other end of the valve stem is driven by, for example, an electric motor installed outside the housing.

When the flow control valve is left with water remaining inside, the water can freeze and increase its volume, generating an excessively large pressure applied to the housing. Conventional flow control valves include metal housings to withstand such excessive pressure applied during freezing. To achieve lighter weight and other performance, recent flow control valves may include resin housings, which are less strong than metal housings and thus can break under high pressure applied during freezing.

A technique has been developed to avoid breakage of a resin housing by allowing a mounting plate for an electric motor or the like to deform plastically to release pressure applied during freezing before the housing breaks (Japanese Unexamined Patent Application Publication No. 2006-292131). However, if water remaining in the housing freezes quicker in areas near the mounting plate than in other areas, the mounting plate cannot deform plastically and cannot release excessive pressure generated in the housing as the freezing proceeds. In this case, the housing can break. Another technique has been developed to allow water to freeze slower in areas near the mounting plate than in other areas by providing a heat insulating layer of air around water near the mounting plate in the housing (Japanese Unexamined Patent Application Publication No. 2012-219877).

Although these techniques can be used to avoid breakage of housings caused by freezing, resin housings are less strong and can break under large external impacts.

SUMMARY OF INVENTION

One or more aspects of the present invention are directed to a flow control valve including a resin housing that avoids breakage caused by freezing and by external impacts.

A first aspect of the present invention provides a flow control valve including a resin housing body, a valve member, a bearing, an O-ring, a retainer plate, a drive unit, and a protective wall. The housing body is substantially cylindrical. The valve member axially moves back and forth in the housing body to regulate a flow rate of a liquid. The bearing is arranged in the housing body at one end of the housing body. The bearing holds a valve stem arranged on the valve member to move the valve stem back and forth. The O-ring joins the bearing to an inner circumferential surface of the housing body in a liquid-tight manner. The retainer plate is fastened to the housing body at a position axially outward from the bearing to retain the bearing in the housing body. The drive unit drives the valve stem at a position outward from the bearing to move the valve member back and forth. The protective wall surrounds an outer circumferential surface of the housing body at a position radially outward from a portion of the housing body that receives the bearing to form an air layer portion between the protective wall and the outer circumferential surface of the housing body. The air layer portion is closed by the retainer plate attached to the housing body at an end thereof near the retainer plate, and is closed by a wall portion extending from the housing body at an end thereof that is axially opposite to the end near the retainer plate.

The flow control valve according to the above aspect of the present invention includes the protective wall that surrounds the outer circumferential surface of the housing body, which accommodates the valve member and the bearing. This forms the air layer portion between the protective wall and the outer circumferential surface of the housing body. The air layer portion is closed by the retainer plate at one end, and is closed by the wall portion extending from the housing body at the other end.

The air layer portion functions as a heat insulating layer, and delays freezing of a liquid around the bearing when the outside air temperature decreases. As the pressure of the liquid in the housing body increases during freezing, the retainer plate deforms and pushes the bearing outward. As a result, the pressure of the liquid is lowered to avoid breakage of the housing body. Additionally, the protective wall that surrounds the housing body prevents breakage of the housing body under strong external impacts.

Another aspect of the present invention provides the flow control valve according to the above aspect of the present invention includes at least one support rod disposed in the air layer portion. The support rod extends parallel to an axis of the housing body and is integral with the outer circumferential surface of the housing body.

The part of the housing body integral with the at least one support rod is stronger than the other part of the housing body with no support rod. When the pressure of the liquid in the housing body increases, the part of the housing body with no support rod deforms outwardly to cause less tight sealing in the corresponding portion of the O-ring. The high-pressure liquid in the housing body is released through this less-tight sealing portion. As a result, the pressure of the liquid is lowered. This structure thus avoids breakage of the housing body caused by freezing without deforming the retainer plate.

Another aspect of the present invention provides the flow control valve according to the above aspect of the present invention in which two support rods are arranged symmetric to each other with respect to a central axis of the housing body, and each support rod has one end to which the retainer plate is fastened.

The retainer plate also functions as a reinforcement and prevents deformation of the part of the housing body having the support rods. The other part of the housing body with no support rod is even less strong. When the pressure of the liquid in the housing body increases during freezing, the less-strong part of the housing body deforms in a more reliable manner. As a result, the pressure of the liquid in the housing body is lowered. This structure thus avoids breakage of the housing body.

Another aspect of the present invention provides the flow control valve according to the above aspect of the present invention in which the housing body includes a portion (receiving portion) at the end thereof where the bearing with the O-ring is arranged, and the receiving portion is thinner than other portions of the housing body.

This structure allows the receiving portion to deform easily when the pressure of the liquid in the housing body increases during freezing. As a result, the pressure of the liquid is lowered easily by releasing the liquid in the housing body. This structure thus avoids breakage of the housing body caused by freezing in a more reliable manner.

Other aspects and advantages of the invention will be apparent upon reading the following description, the drawings, and the claims.

DETAILED DESCRIPTION

Figure 1:
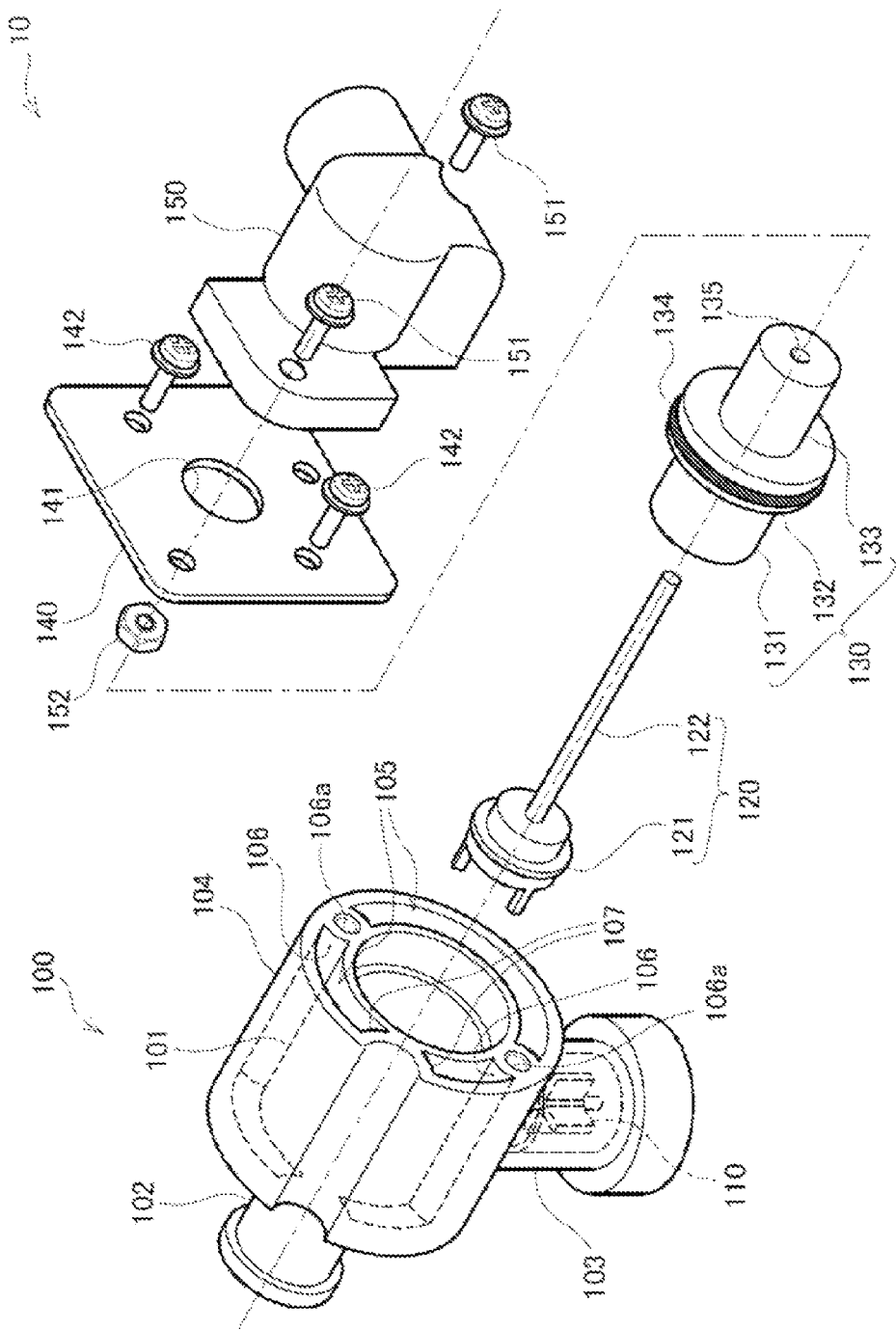
FIG. 1 is an exploded view showing the structure of a flow control valve 10 according to one embodiment of the present invention.

FIG. 1 is an exploded view showing the structure of a flow control valve 10 according to one embodiment of the present embodiment. The flow control valve 10 according to the present embodiment mainly includes a housing 100, a valve unit 120, a bearing 130, a retainer plate 140, and a drive unit 150. The housing 100 is made of resin. The housing 100 includes a substantially cylindrical housing body 101 with one open end, an outlet port 102, which extends from the other end of the housing body 101, and an inlet port 103, which extends from one side surface portion of the housing body 101. The housing body 101 is surrounded by a substantially cylindrical protective wall 104. This structure forms an air layer portion 105 between the outer circumferential surface of the housing body 101 and the protective wall 104. The air layer portion 105 is also open at the open end of the housing body 101, and is closed at the other end of the housing body 101 (where the outlet port 102 is located) by a wall portion 104a extending from the housing body 101.

Further, a pair of substantially cylindrical support rods 106 is arranged between the outer circumferential surface of the housing body 101 and the protective wall 104. The cylindrical support rods 106, which are substantially symmetric to each other with respect to the central axis of the housing body 101, extend parallel to the central axis of the housing body 101. Each cylindrical support rod 106 is integral with the housing body 101 and the protective wall 104. More specifically, each support rod 106 has its one side surface portion integral with the outer circumferential surface of the housing body 101 and the opposite side surface portion integral with the inner circumferential surface of the protective wall 104. The support rods 106 connect the outer circumferential surface of the housing body 101 to the protective wall 104. Each support rod 106 also has a threaded hole 106a at its one end, which is used to fasten the retainer plate 140 to the housing body 101. The protective wall 104 has a semi-cylindrical groove 107, which allows the drive unit 150 to be screwed on the retainer plate 140. The inlet port 103 accommodates a flow sensor 110, which measures the flow rate of a liquid flowing through the flow control valve 10.

The valve unit 120 includes a valve member 121, which is made of resin and rubber, and a metal valve stem 122, to one end of which the valve member 121 is attached. The valve unit 120 is placed into the housing body 101 through its end (open end) to form a valve port between a valve seat (not shown) arranged in the housing body 101 and the valve unit 120.

The bearing 130 is made of resin. The bearing 130 includes a fitting part 131 with a medium diameter, a holder 132 with a large diameter, and a protrusion 133 with a small diameter, which are arranged coaxially in the stated order to form a rotating body. The rotating body has a bearing hole 135 along the rotation axis for axially supporting the valve stem 122 placed through the rotating body. An O-ring 134 is fitted on the outer circumference of the large-diameter holder 132. The bearing 130 holding the valve stem 122 placed through the bearing hole 135 is placed into the housing body 101. The O-ring 134, fitted on the outer circumference of the holder 132, then comes in contact with the inner circumferential surface of the housing body 101 to join the bearing 130 to the housing body 101 in a liquid-tight manner.

The retainer plate 140 is a steel plate with a thickness of about 0.6 to 1 millimeter. The retainer plate 140 has an opening 141 in substantially the center. The opening 141 has a larger diameter than the protrusion 133 of the bearing 130. The retainer plate 140 receives the valve unit 120 and the bearing 130 placed through its one end (open end) into the housing body 101. The retainer plate 140, with the protrusion 133 of the bearing 130 placed through its opening 141, is then fastened to the housing body 101 with screws 142 placed in the threaded holes 106a. This structure retains the bearing 130 without separation from the housing body 101 under liquid pressures up to a predetermined pressure. The retainer plate 140 is also fastened at the two locations, with its two threaded holes 106a located substantially symmetric to each other with respect to the central axis of the housing body 101.

The drive unit 150 may contain an electric motor and a gear mechanism (both not shown). The drive unit 150 drives the valve stem 122 to move the valve stem 122 and the valve member 121 back and forth in the axis direction. The drive unit 150 is mounted onto the retainer plate 140 using screws 151 and nuts 152.

Figure 2:
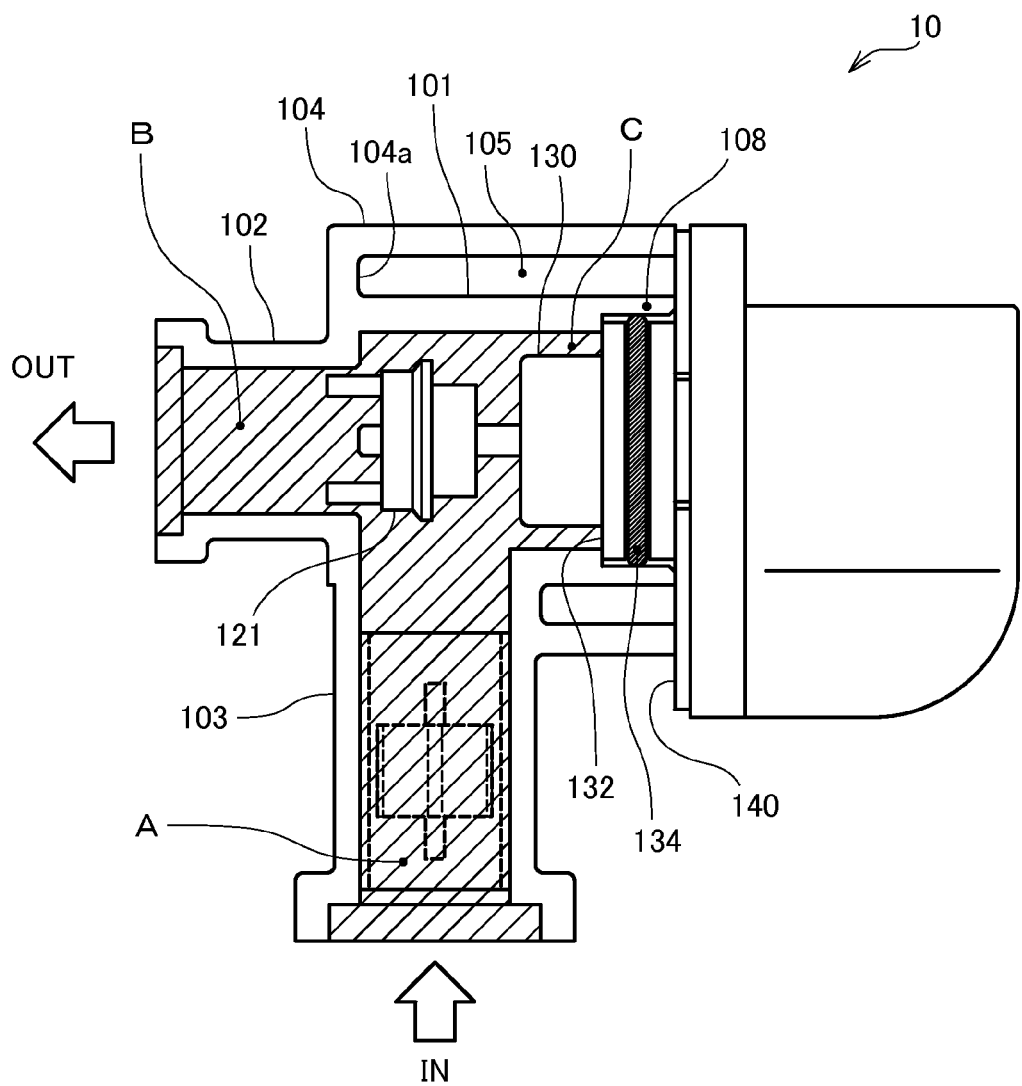
FIG. 2 is a cross-sectional view showing the internal structure of the flow control valve 10 according to the present embodiment.

FIG. 2 is a cross-sectional view showing the internal structure of the flow control valve 10 according to the present embodiment. In the illustrated example, the flow control valve 10 is open. When the flow control valve 10 is open, a liquid, such as water, flows into the housing body 101 through the inlet port 103, fills the inside of the housing body 101, and then flows out of the housing through the outlet port 102. The hatched area in the figure is filled with liquid inside the housing body 101. As described above with reference to FIG. 1, the O-ring 134 fitted in the bearing 130 achieves the liquid-tight joint between the holder 132 of the bearing 130 and the inner circumferential surface of the housing body 101. This prevents the liquid from leaking between the housing body 101 and the holder 132.

As shown in FIG. 2, the housing body 101 according to the present embodiment includes a portion receiving the holder 132 of the bearing 130 (receiving portion 108) that is thinner than other portions of the housing body 101 (thinner than the protective wall 104, which is arranged radially outward from the receiving portion 108, in the example shown in FIG. 2.) The reason for this structure will be described later. The flow control valve 10 according to the present embodiment further includes the air layer portion 105 formed by the outer circumferential surface of the housing body 101 and the protective wall 104. The retainer plate 140 closes the opening of the air layer portion 105. The air layer portion 105 thus functions as a heat insulating layer between the liquid inside the housing body 101 and the outside air. As a result, the temperature of the liquid changes by following the temperature of the outside air more slowly inside the housing body 101 (particularly in area C around the bearing 130 in the figure) than inside the inlet port 103 (in area A in the figure) and inside the outlet port 102 (in area B in the figure).

Figure 3:
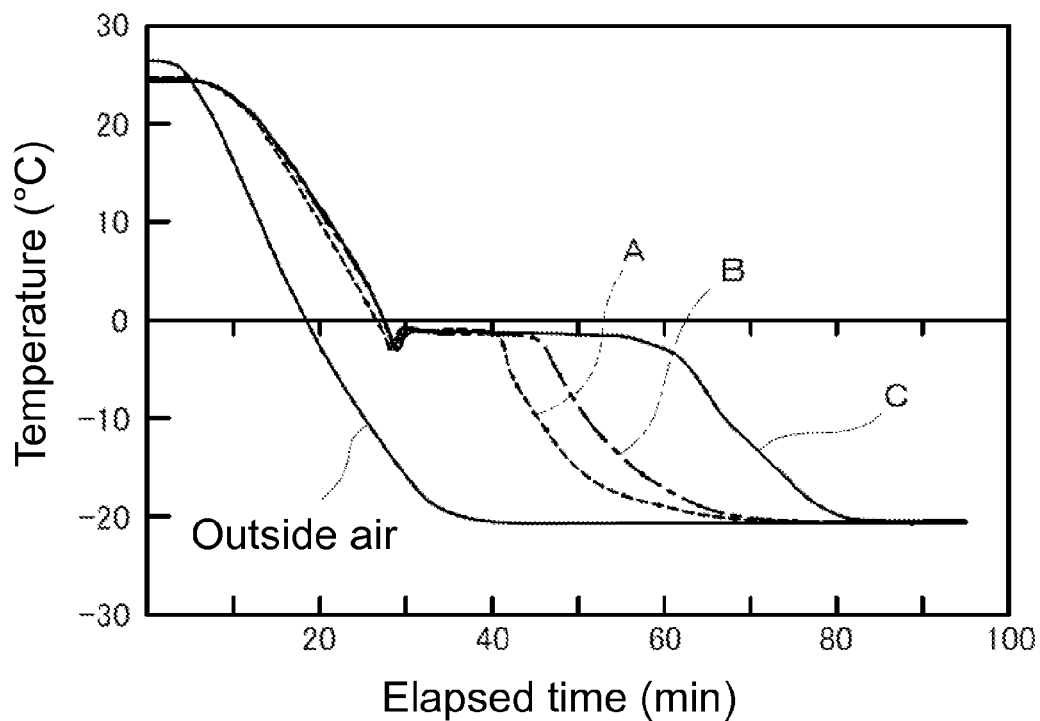
FIG. 3 is a graph showing temperature changes when the flow control valve 10 of the present embodiment containing water remaining inside is cooled.

FIG. 3 is a graph showing the measurement results of the changing temperature of the liquid in the inlet port 103 (area A), the outlet port 102 (area B), and the housing body 101 (area C) as the outside air temperature decreases from 27° C. to −20° C. in about 30 minutes. Although the temperature was measured in the flow control valve 10 that is closed, the same results can be obtained when the flow control valve 10 is open but the liquid has no flow.

As shown in the figure, the temperature of the liquid decreases in area A (inside the inlet port 103) and area B (inside the outlet port 102) as the outside air temperature decreases. The liquid in areas A and B starts freezing when the temperature decreases below 0° C. The liquid freezes completely in about 10 to 15 minutes, after which the liquid temperature decreases monotonically until it reaches the temperature of the outside air (−20° C.). Unlike this, although the temperature of the liquid decreases in area C (inside housing body 101) in the same manner as in the other areas to around 0° C., the liquid subsequently freezes slowly. In the illustrated example, the liquid freezes completely in area C in about 30 minutes, which is about 2 to 3 times longer than the time taken for the liquid to freeze completely in areas A and B. This phenomenon seems to be caused by the air layer portion 105 around the area C, through which the outside air temperature is transferred less easily to the area C than to the areas A and B. This structure thus avoids breakage of the housing 100 caused by freezing.

Figure 4:
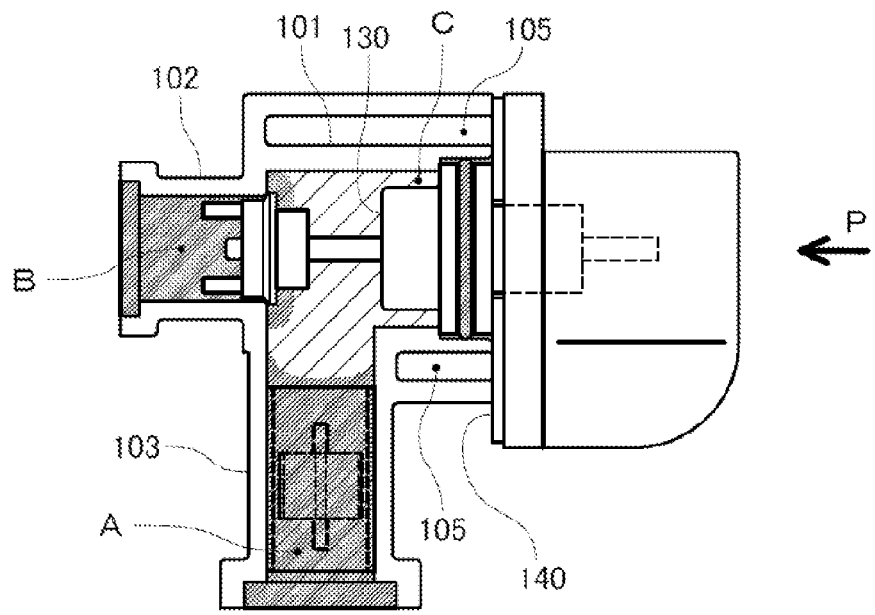
FIG. 4 is a diagram describing how freezing progresses inside the flow control valve 10 of the present embodiment.

FIG. 4 is a diagram describing the mechanism of the flow control valve 10 according to the present invention to avoid breakage of the housing 100 during freezing. As shown in FIG. 4, the liquid freezes completely in area A (inside the inlet port 103) and area B (inside the outlet port 102), and is yet to freeze in area C (inside the housing body 101). The state illustrated in this figure occurs 50 minutes after the measurement is started in FIG. 3. The flow control valve 10 according to the present embodiment includes the air layer portion 105 outside the housing body 101. Thus, the liquid in the housing body 101 undergoes this state before the liquid freezes. In the figure, the densely hatched area indicates the liquid that is frozen, and the less densely hatched area indicates the liquid that is not frozen.

The liquid is known to increase the volume when freezing. In FIG. 4, the outlet port 102 and the inlet port 103 are blocked by the frozen liquid. As the freezing progresses in this state, a large pressure is applied to the liquid in the housing body 101. The pressure acts in the direction toward pushing the bearing 130 out of the housing body 101. The air layer portion 105 delays freezing of the liquid around the bearing 130 in the housing body 101. In addition to these, the retainer plate 140, which is a steel plate with a thickness of about 0.6 to 1 millimeter, is fastened to the housing body 101 simply at two locations. The retainer plate 140 deforms when receiving a relatively large force.

Before the housing body 101 is broken, the bearing 130 deforms the retainer plate 140, and pushes the retainer plate 140 outwardly from the housing body 101. As a result, the liquid pressure in the housing body 101 is lowered. This structure thus avoids breakage of the housing body 101. Additionally, in the flow control valve 10 of the present embodiment, the protective wall 104 surrounds the housing body 101 to protect the housing body 101 from being broken under strong external impacts.

Additionally, the flow control valve 10 according to the present embodiment includes the two support rods 106, which support the outer circumferential surface of the housing body 101 at two locations outside the housing body 101 (refer to FIG. 1). The groove 107 on the protective wall 104, which is integral with the outer circumferential surface of the housing body 101, also externally supports the housing body 101 (refer to FIG. 1). When the liquid in the housing body 101 freezes in the flow control valve 10 of the present embodiment, the housing body 101 deforms to release the liquid pressure. This structure thus avoids breakage of the housing body 101.

Figure 5A:
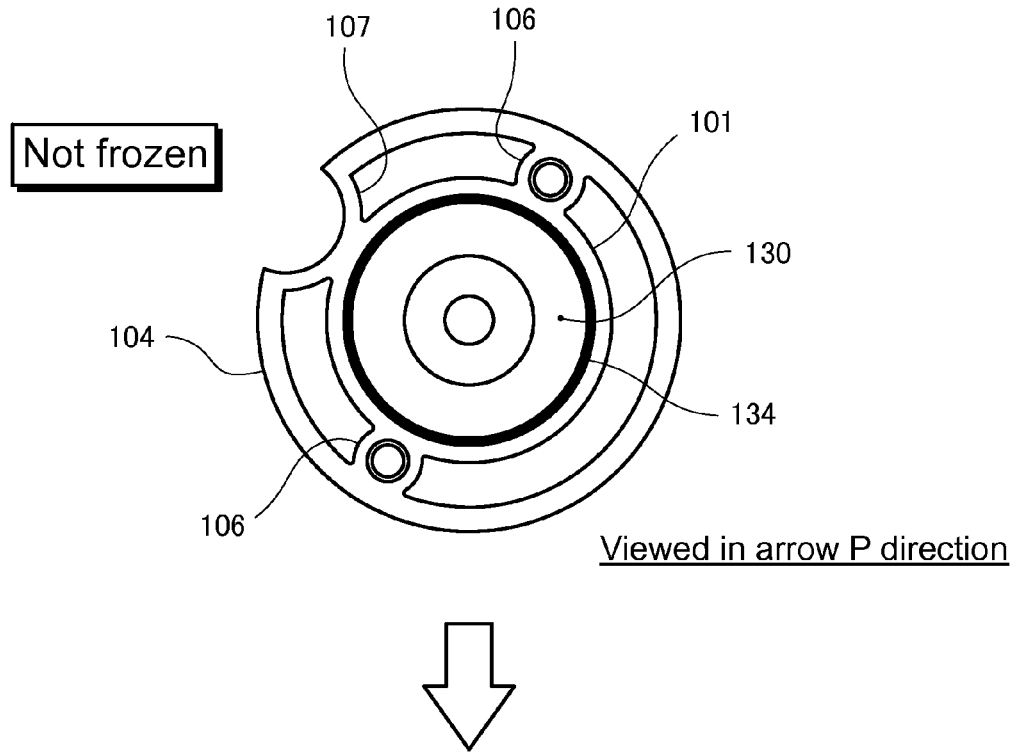
FIGS. 5A and 5B are diagrams describing a mechanism to avoid breakage of a housing body 101 by deforming during freezing.
Figure 5B:
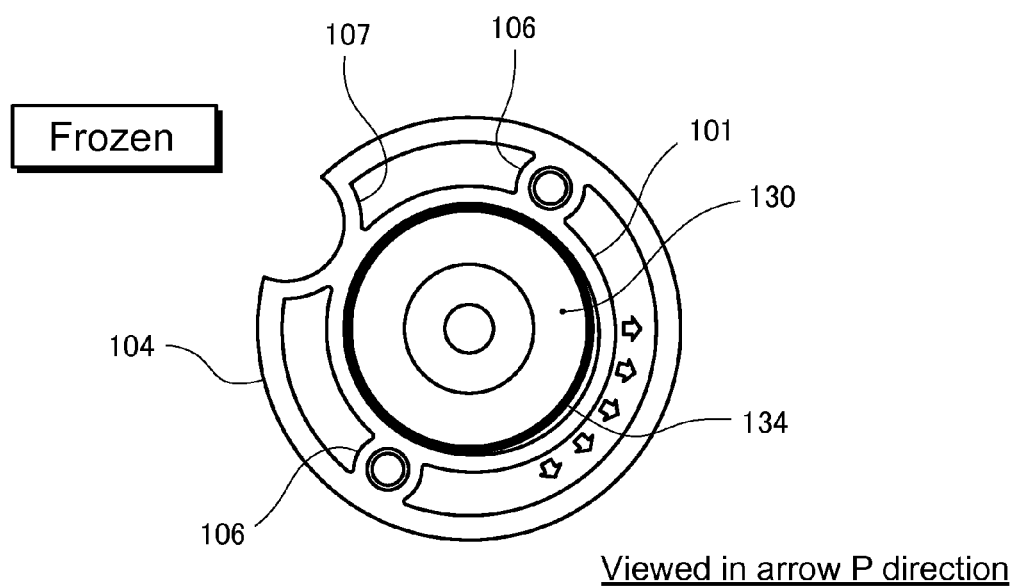

FIGS. 5A and 5B are diagrams describing the mechanism to avoid breakage of the housing body 101 by deforming the housing body 101 and releasing the liquid pressure. FIG. 5A shows the positional relationship between the housing body 101 and the bearing 130 before freezing, as viewed in the direction of arrow P in the FIG. 4. FIG. 5B shows the positional relationship between the housing body 101 and the bearing 130 when the liquid in the areas A and B has been frozen.

As shown in FIG. 5A, the O-ring 134 joins the bearing 130 to the inner circumferential surface of the housing body 101 in a liquid-tight manner before freezing. The outer circumferential surface of the housing body 101 is supported by the support rods 106 in the upper right and the lower left in the figure, and is also supported by the groove 107 in the upper left in the figure. The retainer plate 140, to which the support rods 106 are fastened, also functions as a reinforcement to support the housing body 101 in the upper right and the lower left in the figure. However, no structure supports the housing body 101 in the lower right in the figure. The housing body 101 according to the present embodiment is thus less strong against a force applied in a predetermined direction (in the lower right in the figure in this example).

When the liquid in the inlet port 103 and the outlet port 102 freezes and increases the liquid pressure in the housing body 101 as shown in FIG. 4, the pressure deforms the less strong portion of the housing body 101 outwardly. Although this deformation is not so large to break the housing body 101, this deformation causes the inner circumferential surface portion of the housing body 101, against which the O-ring 134 is pressed, to move outwardly, and thus causes less tight sealing in the corresponding portion. Further, the O-ring 134 does not deform easily at such low temperatures. This may create a gap between the O-ring 134 and the housing body 101 as shown in FIG. 5B. The liquid under high pressure inside the housing body 101 can leak through this less-tight sealing portion. As a result, the pressure in the housing body 101 is lowered. This structure thus avoids breakage of the housing body 101.

As described above with reference to FIG. 2, the housing body 101 of the present embodiment includes the receiving portion 108 that is thinner than the other portions (or may further be thinner than the protective wall 104 receiving no liquid pressure). The receiving portion 108 deforms outwardly to release the liquid pressure before the bearing 130 is pushed out by the liquid pressure increased during freezing and deforms the retainer plate 140. This structure thus avoids breakage of the housing body 101 and further avoids plastic deformation of the retainer plate 140.

Additionally, although the liquid pressure may deform the housing body 101, this does not deform the protective wall 104. The air layer portion 105 between the housing body 101 and the protective wall 104 is closed by the retainer plate 140 (refer to FIG. 2). The air layer portion 105 may thus store the liquid leaking through the sealing achieved by the O-ring 134, and may prevent the liquid from flowing out of the flow control valve 10. Although the air layer portion 105 cannot store a large amount of liquid, a small portion of liquid flowing out of the housing body 101 can greatly lower the pressure inside the housing body 101 and stop subsequent leakage of the liquid. Thus, the air layer portion 105 may avoid overflow of the liquid. The air layer portion 105 is closed by the retainer plate 140 but is not sealed hermetically. In this case, the liquid stored in the air layer portion 105 can evaporate with time. After the liquid inside the housing body 101 freezes completely, the flow control valve 10 according to the present embodiment can later become usable when the outside air temperature increases and the frozen liquid melts.

In the above embodiment, the side surface portions of the support rods 106 (in addition to the housing body 101) are integral with the protective wall 104. In some embodiments, a gap may be formed between the support rods 106 and the protective wall 104. The support rods 106 may only externally support the housing body 101. In the above embodiment, the groove 107 on the protective wall 104 also externally supports the housing body 101. The housing body 101 is supported in the three directions. In some embodiments, the housing body 101 may not be supported in three directions and may only include a portion less strong against a force applied in at least one direction.

Figure 6A:
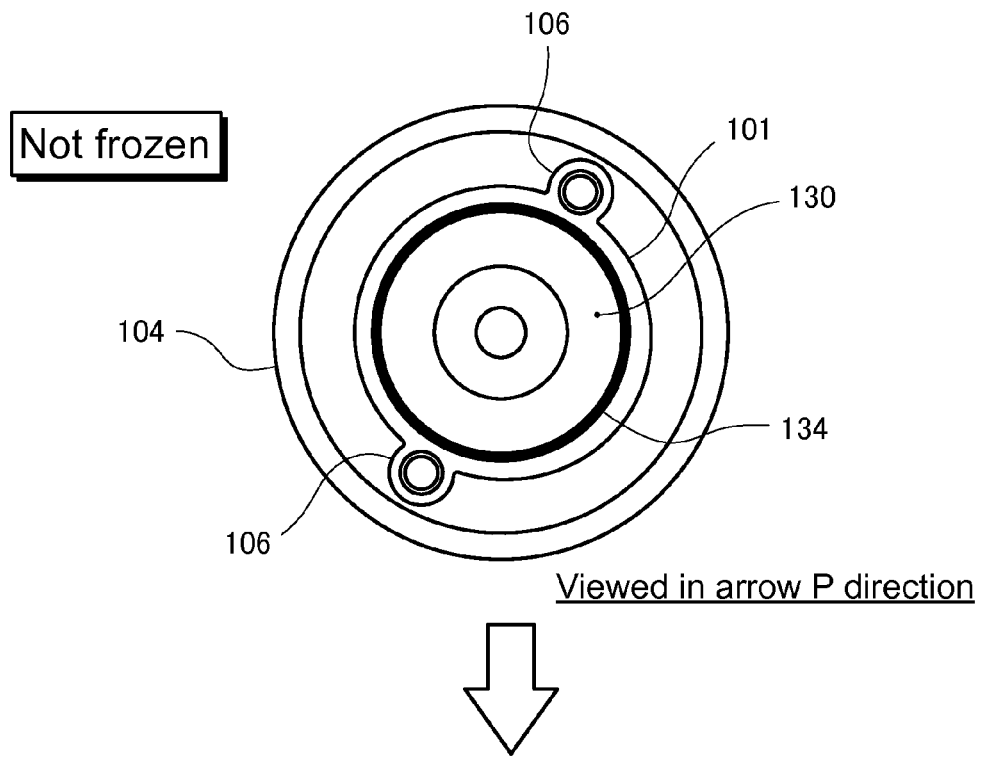
FIGS. 6A and 6B are diagrams describing a mechanism to avoid breakage of a housing body 101 according to a modification during freezing.
Figure 6B:
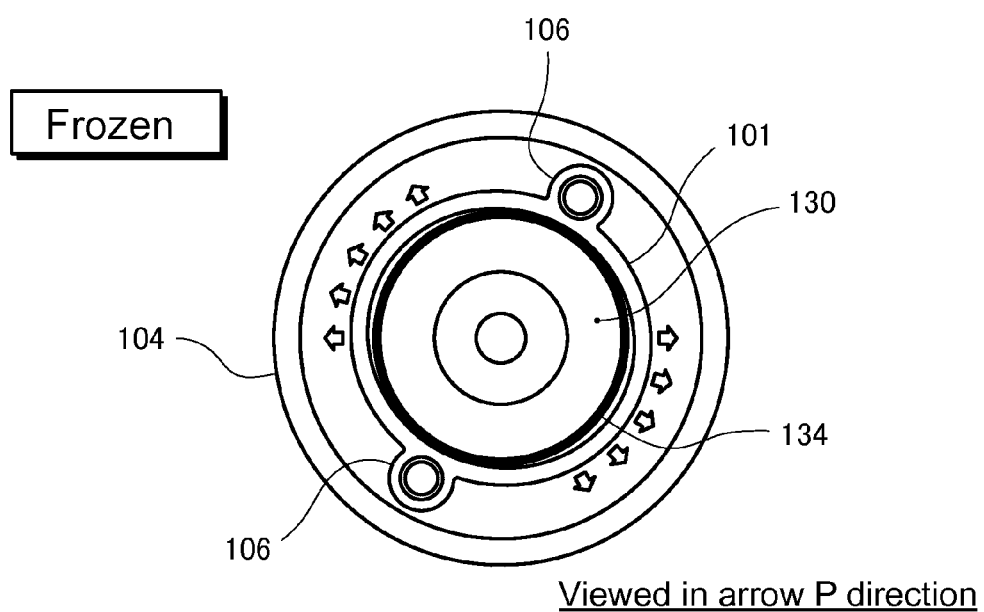

FIGS. 6A and 6B show a housing body 101 according to a modification that is supported in two directions (in the upper right and the lower left in the figures). In this modification, the support rods 106 are spaced from the protective wall 104, and the protective wall 104 has no groove 107. As the pressure of the liquid in the housing body 101 increases during freezing, the housing body 101 deforms and swells outward as indicated by the arrows in FIG. 6B. This causes less tight sealing in the deformed portion of the O-ring 134. The liquid leaks out through the deformed portion. As a result, the pressure in the housing body 101 is lowered. This structure thus avoids breakage of the housing body 101.

Although the embodiments and its modifications have been described, the invention is not limited to the above embodiments and modifications, but may be modified variously without departing from the spirit and scope of the invention.

REFERENCE SIGNS LIST 10 flow control valve
100 housing
101 housing body
102 outlet port
103 inlet port
104 protective wall
104a wall portion
105 air layer portion
106 support rod
106a threaded hole
107 groove
108 receiving portion
110 flow sensor
120 valve unit
121 valve member
122 valve stem
130 bearing
131 fitting part
132 holder
133 protrusion
134 O-ring
135 bearing hole
140 retainer plate
141 opening
142 screw
150 drive unit
151 screw
152 nut

The invention claimed is:

1. A flow control valve, comprising:
a resin housing body that is substantially cylindrical;
a valve member that axially moves back and forth in the housing body to regulate a flow rate of a liquid;
a bearing arranged in the housing body at one end of the housing body, the bearing holding a valve stem arranged on the valve member and moving the valve stem back and forth;
an O-ring that joins the bearing to an inner circumferential surface of the housing body in a liquid-tight manner;
a retainer plate fastened to the housing body at a position axially outward from the bearing to retain the bearing in the housing body;
a drive unit that drives the valve stem at a position outward from the bearing to move the valve member back and forth; and
a protective wall that surrounds an outer circumferential surface of the housing body at a position radially outward from a portion of the housing body that receives the bearing to form an air layer portion between the protective wall and the outer circumferential surface of the housing body,
wherein the air layer portion is closed by the retainer plate attached to the housing body at an end thereof near the retainer plate, and is closed by a wall portion extending from the housing body at an end thereof that is axially opposite to the end near the retainer plate.

2. The flow control valve according to claim 1, wherein the housing body includes a receiving portion at the end thereof where the bearing with the O-ring is arranged, and the receiving portion is thinner than other portions of the housing body.

3. The flow control valve according to claim 1, further comprising one or more support rods disposed in the air layer portion,
wherein the support rod extends parallel to an axis of the housing body and is integral with the outer circumferential surface of the housing body.

4. The flow control valve according to claim 3,
wherein the housing body includes a receiving portion at the end thereof where the bearing with the O-ring is arranged, and the receiving portion is thinner than other portions of the housing body.

5. The flow control valve according to claim 3, wherein the one or more support rods comprise two support rods that are arranged symmetric to each other with respect to a central axis of the housing body, and each support rod has one end to which the retainer plate is fastened.

6. The flow control valve according to claim 5, wherein the housing body includes a receiving portion at the end thereof where the bearing with the O-ring is arranged, and the receiving portion is thinner than other portions of the housing body.

* * * * *